US012227207B2

(12) United States Patent
Gunaratne

(10) Patent No.: US 12,227,207 B2
(45) Date of Patent: *Feb. 18, 2025

(54) FAULT DETECTION IN CONTROL SYSTEM FOR AUTONOMOUS VEHICLE

(71) Applicant: Aurora Operations, Inc., Pittsburgh, PA (US)

(72) Inventor: Anuranga Sajith Gunaratne, San Francisco, CA (US)

(73) Assignee: Aurora Operations, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,929

(22) Filed: Dec. 4, 2023

(65) Prior Publication Data

US 2024/0101156 A1    Mar. 28, 2024

Related U.S. Application Data

(63) Continuation of application No. 17/536,989, filed on Nov. 29, 2021, now Pat. No. 11,884,300, which is a (Continued)

(51) Int. Cl.
*B60W 60/00* (2020.01)
*B60R 16/023* (2006.01)
(Continued)

(52) U.S. Cl.
CPC ...... *B60W 60/0021* (2020.02); *B60W 60/001* (2020.02); *B60W 60/0011* (2020.02);
(Continued)

(58) Field of Classification Search
CPC ........... B60W 60/0021; B60W 60/001; B60W 60/0011; B60W 10/18; B60W 10/20; B60W 50/0205; B60W 50/023; B60R 16/0232

See application file for complete search history.

(56) References Cited

U.S. PATENT DOCUMENTS 9,195,232 B1 * 11/2015 Egnor .................. B60W 10/20
9,523,984 B1 * 12/2016 Herbach ............... B60W 10/18
(Continued)

FOREIGN PATENT DOCUMENTS

CN    111314420 A  *  6/2020   ......... H04L 41/0816

OTHER PUBLICATIONS

Translation of CN-111314420-A, 9 pages (Year: 2020).*
(Continued)

*Primary Examiner* — Dale W Hilgendorf
(74) *Attorney, Agent, or Firm* — Freestone Intellectual Property Law PLLC; Aaron J. Visbeek

(57) ABSTRACT

A control system for an autonomous vehicle includes a time sensitive network switch and a control system interface. The control system interface includes a primary processing unit, a secondary processing unit, and a fault detection module. The control system receives a trajectory of an autonomous vehicle. The fault detection module detects a fault condition with the primary processing unit and prevents the primary processing unit from transmitting a primary control signal in response to the fault condition. The primary control signal is for autonomous control of the autonomous vehicle.

17 Claims, 7 Drawing Sheets

Related U.S. Application Data continuation of application No. 17/198,127, filed on Mar. 10, 2021, now Pat. No. 11,214,271.

(51) Int. Cl.
- *B60W 10/18* (2012.01)
- *B60W 10/20* (2006.01)
- *B60W 50/02* (2012.01)
- *B60W 50/023* (2012.01)

(52) U.S. Cl.
CPC .......... *B60R 16/0232* (2013.01); *B60W 10/18* (2013.01); *B60W 10/20* (2013.01); *B60W 50/0205* (2013.01); *B60W 50/023* (2013.01)

(56) References Cited

U.S. PATENT DOCUMENTS

| | | | |
|---|---|---|---|
| 10,632,942 B1* | 4/2020 | Christie | G05D 1/0088 |
| 11,214,271 B1* | 1/2022 | Gunaratne | G06F 11/2038 |
| 11,341,789 B2* | 5/2022 | Castano | H04L 67/12 |
| 11,884,300 B2* | 1/2024 | Gunaratne | G06F 11/2043 |
| 2015/0039174 A1* | 2/2015 | Takahashi | H04B 7/26 701/29.1 |
| 2017/0122754 A1* | 5/2017 | Konishi | B60W 10/20 |
| 2018/0143633 A1* | 5/2018 | Paryani | B60W 10/12 |
| 2018/0272963 A1 | 9/2018 | Meyhofer et al. | |
| 2019/0050692 A1 | 2/2019 | Sharma et al. | |
| 2019/0079513 A1* | 3/2019 | Greenfield | B60W 60/00186 |
| 2019/0258251 A1* | 8/2019 | Ditty | G05D 1/0274 |
| 2019/0273909 A1 | 9/2019 | Ye et al. | |
| 2019/0324450 A1* | 10/2019 | Lurie | H04L 12/40026 |
| 2021/0253128 A1* | 8/2021 | Nister | G06N 3/08 |
| 2022/0048525 A1* | 2/2022 | Tsai | B60W 50/0098 |
| 2022/0067525 A1* | 3/2022 | Sequeira | B60W 10/04 |
| 2022/0237414 A1* | 7/2022 | Zhang | A01M 21/00 |
| 2022/0289212 A1* | 9/2022 | Gunaratne | G06F 11/2025 |
| 2022/0396289 A1* | 12/2022 | Li | G01C 21/3407 |

OTHER PUBLICATIONS

Co-pending U.S. Appl. No. 16/126,533 Applicant of cited Document Aurora Innovation, Inc., filed Mar. 14, 2019.

Non-Final Office Action, U.S. Appl. No. 17/977,396, Notification Date: Apr. 12, 2023, 33 pages.

* cited by examiner

FAULT DETECTION IN CONTROL SYSTEM FOR AUTONOMOUS VEHICLE

CROSS-REFERENCE TO RELATED APPLICATIONS

This application is a continuation of U.S. non-provisional patent Application No. 17/536,989 filed Nov. 29, 2021, now patented as U.S. Pat. No. 11,884,300 issued Jan. 30, 2024, which is a continuation of U.S. non-provisional Application No. 17/198,127 filed Mar. 10, 2021, now patented as U.S. Pat. No. 11,214,271 issued Jan. 4, 2022. Both applications are hereby incorporated by reference.

TECHNICAL FIELD

This disclosure relates generally to autonomous vehicles and in particular to a control system interface for autonomous vehicles.

BACKGROUND INFORMATION

The automobile industry is currently developing autonomous features for controlling vehicles under certain circumstances. According to Society of Automotive Engineers (SAE) International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment.

BRIEF SUMMARY OF THE INVENTION

In an implementation of the disclosure, a control system interface for a vehicle includes a primary processing unit, a secondary processing unit, and a fault detection module. The primary processing unit is configured to receive and process a trajectory that is generated by a trajectory computing unit. The primary processing unit processes the trajectory to determine at least one primary control signal for autonomous control of the vehicle. The secondary processing unit is configured to receive the same trajectory concurrently with the primary processing unit. The secondary processing unit processes the trajectory to determine at least one secondary control signal for autonomous control of the vehicle. The fault detection module is configured to detect a fault condition with the primary processing unit. In response to detecting the fault condition with the primary processing unit, the fault detection module is configured to prevent the primary processing unit from transmitting the primary control signal to an internal system of the vehicle and to allow the secondary processing unit to generate and transmit the secondary control signal to the internal system for the autonomous control of the vehicle.

In an implementation, in the absence of detecting the fault condition, the fault detection module is configured to allow the primary processing unit to generate and transmit the primary control signal and to allow the secondary processing unit to generate and transmit the secondary control signal to the internal system.

In some implementations, the fault detection module is further configured to detect a fault condition with the secondary processing unit. If the fault condition is detected with the secondary processing unit, the fault detection module prevents the secondary processing unit from transmitting the secondary control signal to the internal system and allows the primary processing unit to generate and transmit the primary control signal to the internal system.

In an implementation, the fault detection module is configured to detect the fault condition in response to the control system interface receiving an indication, from the internal system, that a previous primary control signal transmitted by the primary processing unit was non-compliant or ineffective.

In an implementation, the fault detection module is configured to detect the fault condition in response to detecting an incorrect signal level on one or more buses coupled to the primary processing unit.

In an implementation, the fault detection module comprises a watchdog timer communicatively coupled to the primary processing unit to detect the fault condition.

In an implementation, the primary processing unit is coupled to periodically receive measurement data from one or more inertial measurement units (IMUs) of the vehicle. The fault detection module may be configured to detect the fault condition in response to an absence of measurement data being received by the primary processing unit.

In an implementation, the internal system of the vehicle is configured to generate and transmit a feedback response to the primary processing unit in response to a previous control signal transmitted by the primary processing unit, wherein the fault detection module is configured to detect the fault condition in response to an absence of the feedback response being received by the primary processing unit.

In an implementation, the fault detection module is configured to detect the fault condition in response to an absence of the trajectory being received by the primary processing unit.

In an implementation, the internal system is a controller area network (CAN) bus of the vehicle, and where the control system interface is to be coupled as a gateway between the trajectory computing unit and the CAN. In some aspects, the primary processing unit is configured to process the trajectory by translating the trajectory into the primary control signal for transmission to the CAN to adjust at least one of steering, braking, or acceleration of the vehicle.

In an implementation, the primary processing unit is configured to generate and transmit one or more remedial control signals to the internal system to maintain control of the vehicle in response to detecting a fault with the trajectory computing unit.

In an implementation, when the fault detection module detects the fault condition in the primary processing unit, the secondary processing unit maintains control of the vehicle until a power cycle or hard reset of the control system interface.

In an implementation, the control system interface is coupled to a time-sensitive network switch. The primary processing unit and the secondary processing unit may be coupled to receive the trajectory from the trajectory computing unit through the time-sensitive network switch.

In an implementation, the secondary processing unit is configured to determine the secondary control signal in response to a code base that is independent and distinct from a code base utilized by the primary processing unit.

In one illustrative implementation an autonomous vehicle includes a trajectory computing unit for generating one or more trajectories. The trajectories may include a sequence of one or more actions that are to be performed to autonomously control movement of the vehicle. For example, the trajectory may include instructions for the execution of one or more steering, acceleration, and/or braking commands to control the movement of the vehicle along a certain path (e.g., a curved path, a straight-line path, etc.). The trajectory is then transmitted to a control system interface, which is coupled as a gateway between the trajectory computing unit and an internal system of the vehicle, such as a controller area network (CAN) bus. The control system interface is configured to translate the trajectory into one or more control signals (e.g., CAN signals) for transmission to one or more control systems (e.g., steering, powertrain, brake control, etc.) of the vehicle through the CAN bus. Thus, in some aspects, the trajectory computing unit does not have direct access to the CAN bus nor to the various control systems, and instead, trajectories generated by the trajectory computing unit are passed through the control system interface to the CAN bus in order to effectuate actual control of the vehicle.

In addition to acting as a gateway between the trajectory computing unit and the internal system of the vehicle (e.g., CAN bus), the control system interface is included to provide various forms of fault tolerance for the autonomous control of the vehicle. For example, the control system interface may be configured to detect a variety of faults and to take one or more steps to maintain control of the vehicle even in the presence of the fault.

As will be described in more detail below, the control system interface includes a primary processing unit and a secondary processing unit. In some implementations, the primary processing unit and the secondary processing unit are both continuously active, processing the received trajectory, independently of one another. That is, the primary processing unit is configured to receive and process the trajectory to determine a primary control signal, whereas the secondary processing unit is configured to concurrently receive and process the trajectory to determine a secondary control signal. In some implementations, the control system interface may be configured to determine whether there is a fault condition with primary processing unit (e.g., software fault, hardware fault, etc.). If there is no fault condition detected with the primary processing unit, the primary processing unit is allowed to transmit the primary control signal to the internal system. If, however, a fault condition is detected with the primary processing unit, autonomous control of the vehicle is passed from the primary processing unit to the secondary processing unit by preventing the transmission of the primary control signal to the internal system. In addition, the control system interface may detect a fault with the trajectory computing unit, itself, where the control system interface then provides one or more remedial control signals to the internal system (e.g., stop the vehicle, direct the vehicle to the side of a road, etc.).

BRIEF DESCRIPTION OF THE DRAWINGS

Non-limiting and non-exhaustive implementations of the invention are described with reference to the following figures, wherein like reference numerals refer to like parts throughout the various views unless otherwise specified.

DETAILED DESCRIPTION

Implementations of a control system interface and an autonomous vehicle are described herein. In the following description, numerous specific details are set forth to provide a thorough understanding of the implementations. One skilled in the relevant art will recognize, however, that the techniques described herein can be practiced without one or more of the specific details, or with other methods, components, or materials. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

Figure 1A:
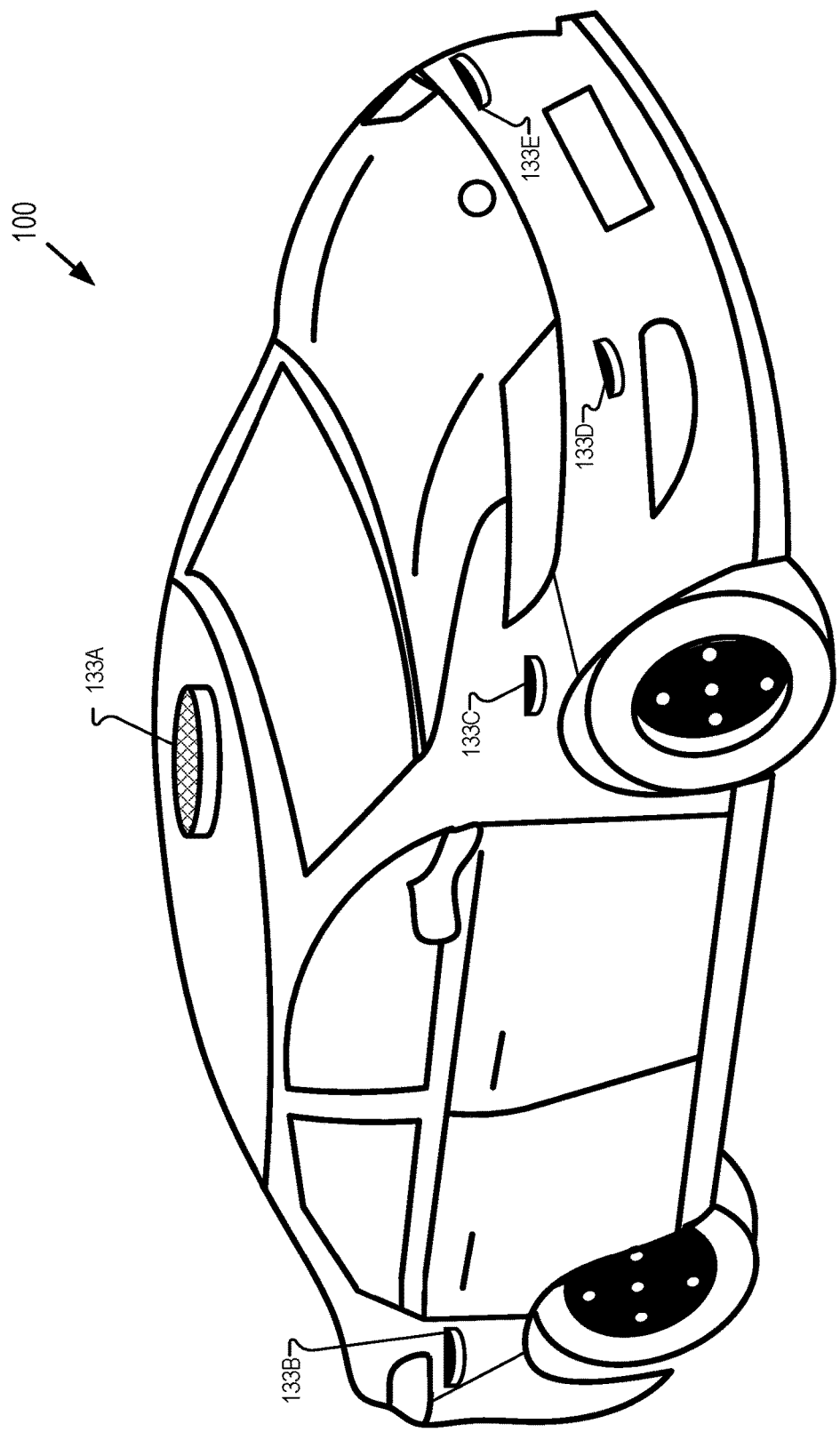
FIG. 1A illustrates an autonomous vehicle including an array of example sensors, in accordance with aspects of the disclosure.
Figure 1B:
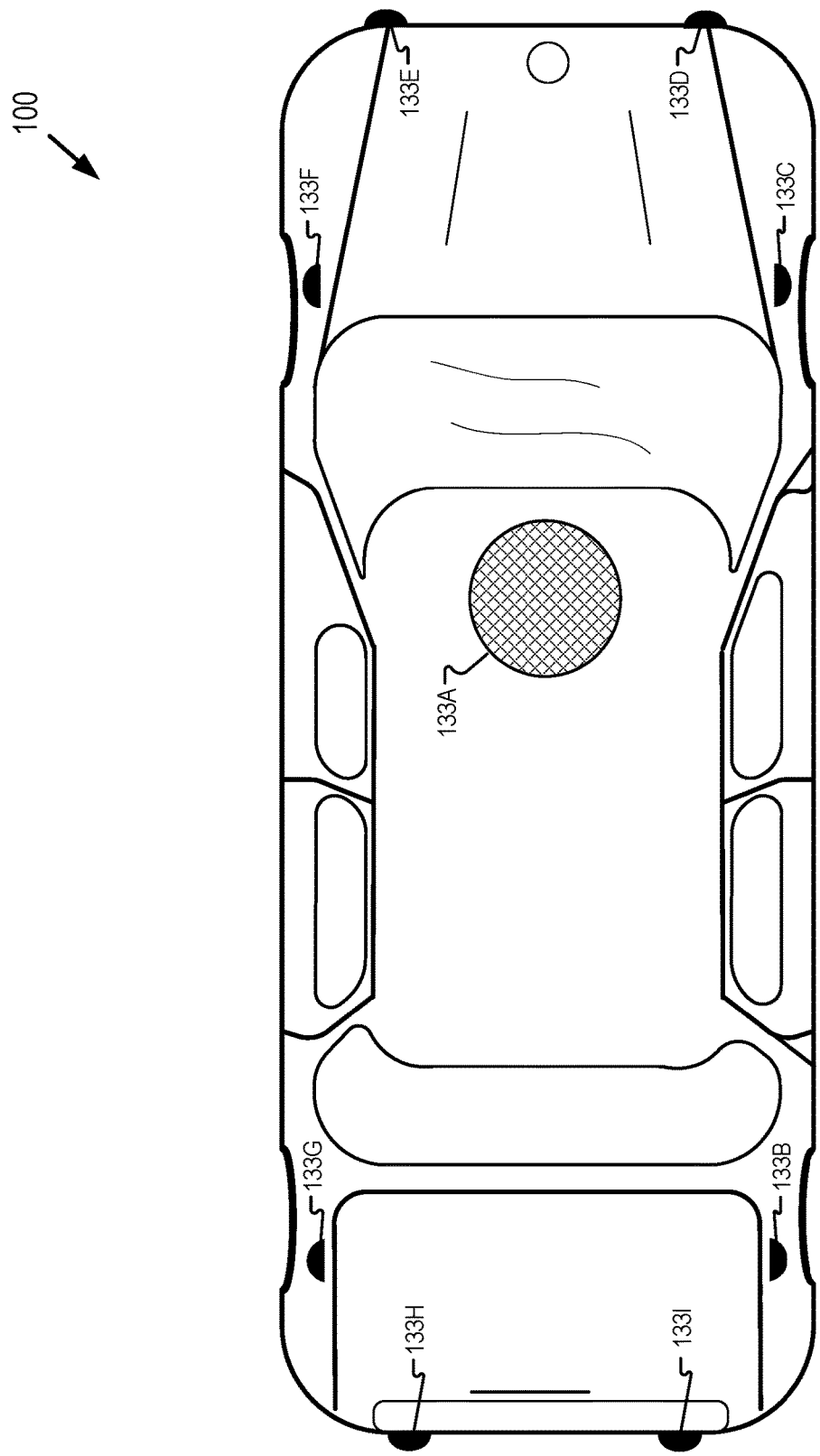
FIG. 1B illustrates a top view of an autonomous vehicle including an array of example sensors, in accordance with aspects of the disclosure.
Figure 1C:
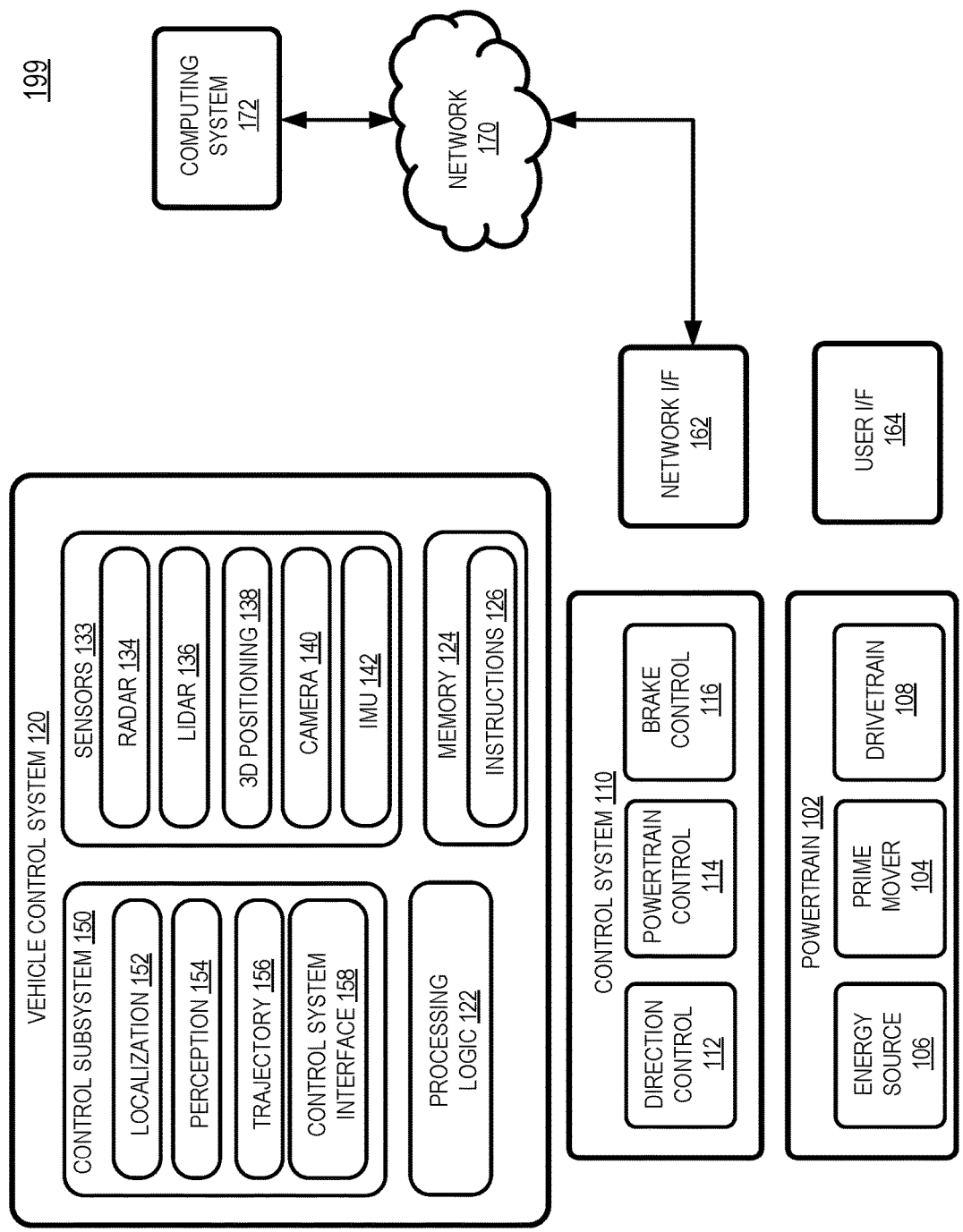
FIG. 1C illustrates an example vehicle control system including sensors, a drivetrain, and a control system, in accordance with aspects of the disclosure.

FIG. 1A illustrates an example autonomous vehicle 100, in accordance with aspects of the disclosure. The illustrated autonomous vehicle 100 includes an array of sensors configured to capture one or more objects of an external environment of the autonomous vehicle and to generate sensor data related to the captured one or more objects for purposes of controlling the operation of autonomous vehicle 100. FIG. 1A shows sensor 133A, 133B, 133C, 133D, and 133E. FIG. 1B illustrates a top view of autonomous vehicle 100 including sensors 133F, 133G, 133H, and 133I in addition to sensors 133A, 133B, 133C, 133D, and 133E. FIG. 1C illustrates a block diagram of an example system 199 for autonomous vehicle 100. For example, autonomous vehicle 100 may include powertrain 102 including prime mover 104 powered by energy source 106 and capable of providing power to drivetrain 108. Autonomous vehicle 100 may further include control system 110 that includes direction control 112, powertrain control 114, and brake control 116. Autonomous vehicle 100 may be implemented as any number of different vehicles, including vehicles capable of transporting people and/or cargo and capable of traveling in a variety of different environments. It will be appreciated that the aforementioned components 102-116 can vary widely based upon the type of vehicle within which these components are utilized.

The implementations discussed hereinafter, for example, will focus on a wheeled land vehicle such as a car, van, truck, or bus. In such implementations, prime mover 104 may include one or more electric motors and/or an internal combustion engine (among others). The energy source may include, for example, a fuel system (e.g., providing gasoline, diesel, hydrogen), a battery system, solar panels or other renewable energy source, and/or a fuel cell system. Drivetrain 108 may include wheels and/or tires along with a transmission and/or any other mechanical drive components suitable for converting the output of prime mover 104 into vehicular motion, as well as one or more brakes configured to controllably stop or slow the autonomous vehicle 100 and direction or steering components suitable for controlling the trajectory of the autonomous vehicle 100 (e.g., a rack and pinion steering linkage enabling one or more wheels of autonomous vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles). In some implementations, multiple electric motors (e.g., dedicated to individual wheels or axles) may be used as a prime mover.

Direction control 112 may include one or more actuators and/or sensors for controlling and receiving feedback from the direction or steering components to enable the autonomous vehicle 100 to follow a desired trajectory. Powertrain control 114 may be configured to control the output of powertrain 102, e.g., to control the output power of prime mover 104, to control a gear of a transmission in drivetrain 108, thereby controlling a speed and/or direction of the autonomous vehicle 100. Brake control 116 may be configured to control one or more brakes that slow or stop autonomous vehicle 100, e.g., disk or drum brakes coupled to the wheels of the vehicle.

Other vehicle types, including but not limited to off-road vehicles, all-terrain or tracked vehicles, or construction equipment will necessarily utilize different powertrains, drivetrains, energy sources, direction controls, powertrain controls, and brake controls, as will be appreciated by those of ordinary skill having the benefit of the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, autonomous control over autonomous vehicle 100 is implemented in vehicle control system 120, which may include one or more processors in processing logic 122 and one or more memories 124, with processing logic 122 configured to execute program code (e.g. instructions 126) stored in memory 124. Processing logic 122 may include graphics processing unit(s) (GPUs) and/or central processing unit(s) (CPUs), for example.

Sensors 133A-133I may include various sensors suitable for collecting data from an autonomous vehicle's surrounding environment for use in controlling the operation of the autonomous vehicle. For example, sensors 133A-133I can include RADAR unit 134, LIDAR unit 136, 3D positioning sensor(s) 138, e.g., a satellite navigation system such as GPS, GLONASS, BeiDou, Galileo, or Compass. In some implementations, 3D positioning sensor(s) 138 can determine the location of the vehicle on the Earth using satellite signals. Sensors 133A-133I can optionally include one or more ultrasonic sensors, one or more cameras 140, and/or an Inertial Measurement Unit (IMU) 142. In some implementations, camera 140 can be a monographic or stereographic camera and can record still and/or video images. Camera 140 may include a Complementary Metal-Oxide-Semiconductor (CMOS) image sensor configured to capture images of one or more objects in an external environment of autonomous vehicle 100. IMU 142 can include multiple gyroscopes and accelerometers capable of detecting linear and rotational motion of autonomous vehicle 100 in three directions. One or more encoders (not illustrated) such as wheel encoders may be used to monitor the rotation of one or more wheels of autonomous vehicle 100.

The outputs of sensors 133A-133I may be provided to control subsystems 150, including, localization subsystem 152, trajectory subsystem 156, perception subsystem 154, and control system interface 158. Localization subsystem 152 is configured to determine the location and orientation (also sometimes referred to as the "pose") of autonomous vehicle 100 within its surrounding environment, and generally within a particular geographic area. The location of an autonomous vehicle can be compared with the location of an additional vehicle in the same environment as part of generating labeled autonomous vehicle data. Perception subsystem 154 is configured to detect, track, classify, and/or determine objects within the environment surrounding autonomous vehicle 100. Trajectory subsystem 156 is configured to generate a trajectory for autonomous vehicle 100 over a particular timeframe given a desired destination, as well as the static and moving objects within the environment. A machine learning model in accordance with several implementations can be utilized in generating a vehicle trajectory. Control system interface 158 is configured to communicate with control system 110 in order to implement the trajectory of the autonomous vehicle 100. In some implementations, a machine learning model can be utilized to control an autonomous vehicle to implement the planned trajectory.

It will be appreciated that the collection of components illustrated in FIG. 1C for vehicle control system 120 is merely exemplary in nature. Individual sensors may be omitted in some implementations. In some implementations, different types of sensors illustrated in FIG. 1C may be used for redundancy and/or for covering different regions in an environment surrounding an autonomous vehicle. In some implementations, different types and/or combinations of control subsystems may be used. Further, while subsystems 152-158 are illustrated as being separate from processing logic 122 and memory 124, it will be appreciated that in some implementations, some or all of the functionality of subsystems 152-158 may be implemented with program code such as instructions 126 resident in memory 124 and executed by processing logic 122, and that these subsystems 152-158 may in some instances be implemented using the same processor(s) and/or memory. Subsystems in some implementations may be implemented at least in part using various dedicated circuit logic, various processors, various field programmable gate arrays (FPGA), various application-specific integrated circuits (ASIC), various real time controllers, and the like, as noted above, multiple subsystems may utilize circuitry, processors, sensors, and/or other components. Further, the various components in vehicle control system 120 may be networked in various manners.

In some implementations, autonomous vehicle 100 may also include a secondary vehicle control system (not illustrated), which may be used as a redundant or backup control system for autonomous vehicle 100. In some implementations, the secondary vehicle control system may be capable of operating autonomous vehicle 100 in response to a particular event. The secondary vehicle control system may only have limited functionality in response to the particular event detected in primary vehicle control system 120. In still other implementations, the secondary vehicle control system may be omitted.

In some implementations, different architectures, including various combinations of software, hardware, circuit logic, sensors, and networks may be used to implement the various components illustrated in FIG. 1C. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), or read- only memories. In addition, each memory may be considered to include memory storage physically located elsewhere in autonomous vehicle 100, e.g., any cache memory in a processor, as well as any storage capacity used as a virtual memory, e.g., as stored on a mass storage device or another computer controller. Processing logic 122 illustrated in FIG. 1C, or entirely separate processing logic, may be used to implement additional functionality in autonomous vehicle 100 outside of the purposes of autonomous control, e.g., to control entertainment systems, to operate doors, lights, or convenience features.

In addition, for additional storage, autonomous vehicle 100 may also include one or more mass storage devices, e.g., a removable disk drive, a hard disk drive, a direct access storage device (DASD), an optical drive (e.g., a CD drive, a DVD drive), a solid state storage drive (SSD), network attached storage, a storage area network, and/or a tape drive, among others. Furthermore, autonomous vehicle 100 may include a user interface 164 to enable autonomous vehicle 100 to receive a number of inputs from a passenger and generate outputs for the passenger, e.g., one or more displays, touchscreens, voice and/or gesture interfaces, buttons and other tactile controls. In some implementations, input from the passenger may be received through another computer or electronic device, e.g., through an app on a mobile device or through a web interface.

In some implementations, autonomous vehicle 100 may include one or more network interfaces, e.g., network interface 162, suitable for communicating with one or more networks 170 (e.g., a Local Area Network (LAN), a wide area network (WAN), a wireless network, and/or the Internet, among others) to permit the communication of information with other computers and electronic devices, including, for example, a central service, such as a cloud service, from which autonomous vehicle 100 receives environmental and other data for use in autonomous control thereof. In some implementations, data collected by one or more sensors 133A-133I can be uploaded to computing system 172 through network 170 for additional processing. In such implementations, a time stamp can be associated with each instance of vehicle data prior to uploading.

Processing logic 122 illustrated in FIG. 1C, as well as various additional controllers and subsystems disclosed herein, generally operates under the control of an operating system and executes or otherwise relies upon various computer software applications, components, programs, objects, modules, or data structures, as may be described in greater detail below. Moreover, various applications, components, programs, objects, or modules may also execute on one or more processors in another computer coupled to autonomous vehicle 100 through network 170, e.g., in a distributed, cloud-based, or client-server computing environment, whereby the processing required to implement the functions of a computer program may be allocated to multiple computers and/or services over a network.

Routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter may be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets), it should be appreciated that the invention is not limited to the specific organization and allocation of program functionality described herein.

Those skilled in the art, having the benefit of the present disclosure, will recognize that the exemplary environment illustrated in FIG. 1C is not intended to limit implementations disclosed herein. Indeed, those skilled in the art will recognize that other alternative hardware and/or software environments may be used without departing from the scope of implementations disclosed herein.

Figure 2:
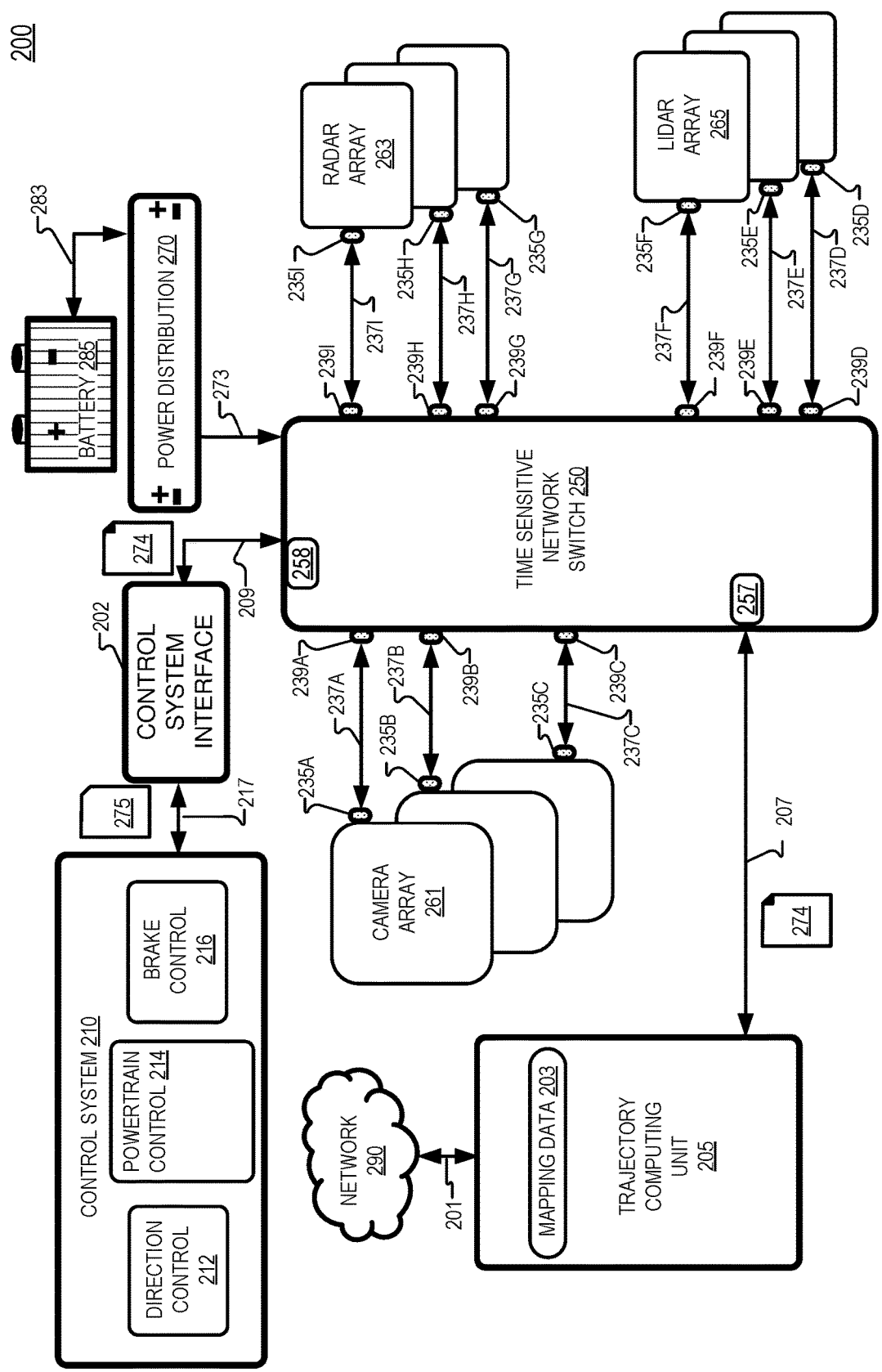
FIG. 2 illustrates a block diagram of an example system that may be included in a vehicle, in accordance with aspects of the disclosure.

FIG. 2 illustrates a block diagram of example system 200 that may be included in an autonomous vehicle, in accordance with aspects of the disclosure. System 200 is one implementation of one or more of the components illustrated in system 199 of FIG. 1C. The illustrated example of system 200 is shown as including trajectory computing unit 205, time sensitive network switch 250, power distribution module 270, vehicle battery 285, network 290, camera array 261, RADAR sensor array 263, LIDAR sensor array 265, and control system interface 202. Sensors in addition to camera array 261, RADAR sensor array 263, and LIDAR sensor array 265 may also be included in system 200. Vehicle battery 285 may be a main vehicle battery for a vehicle such as autonomous vehicle 100 for operating the vehicle electrical subsystems. Vehicle battery 285 may provide a voltage of 12-14 VDC, for example. Vehicle battery 285 is configured to provide electrical power to power distribution module 270 through battery interface 283, in FIG. 2. Power distribution module 270 may be configured to convert the vehicle battery voltage provided by vehicle battery 285 to an elevated voltage and provide the elevated voltage to time sensitive network switch 250 through elevated voltage interface 273. Power distribution module 270 may include power converters and/or power regulators (e.g. switching power supplies) configured to convert the vehicle battery voltage to an elevated voltage.

In addition to receiving the elevated voltage from power distribution module 270, time sensitive network switch 250 is configured to send and receive data. In autonomous vehicles, high-speed data transfer for data that impacts vehicle operation is critical. Time sensitive network switch 250 is communicatively coupled to trajectory computing unit 205 through high-speed data interface 207. High-speed data interface 207 may be one or more 10 Gigabit per second (Gb/s) connections. In an implementation, trajectory computing unit 205 is communicatively coupled to time sensitive network switch 250 through two 10 Gb/s connections of high-speed data interface 207.

Time sensitive network switch 250 is individually coupled to a plurality of sensors by way of a data-power interface, in FIG. 2. In the particular illustration of FIG. 2, time sensitive network switch 250 is individually coupled to each camera in camera array 261 through data-power interfaces 237A, 237B, and 237C. That is, each camera in camera array 261 has a connector (e.g. connectors 235A-235C) coupled to a connector (e.g. connectors 239A-239C) of time sensitive network switch 250 through its own data-power interface (e.g. data-power interface 237A-237C). In the illustrated implementation of FIG. 2, connector 235A is coupled to connector 239A through data-power interface 237A, connector 235B is coupled to connector 239B through data-power interface 237B, and connector 235C is coupled to connector 239C through data-power interface 237C. Similarly, time sensitive network switch 250 is individually coupled to each RADAR sensor in RADAR sensor array 263 through data-power interfaces 237G, 237H, and 237I. That is, each RADAR sensor in RADAR sensor array 263 has a connector (e.g. connectors 235G-235I) coupled to a connector (e.g. connectors 239G-239I) of time sensitive network switch 250 through its own data-power interface (e.g. data-power interface 237G-237I). In the illustrated implementation of FIG. 2, connector 235G is coupled to connector 239G through data-power interface 237G, connector 235H is coupled to connector 239H through data-power interface 237H, and connector 235I is coupled to connector 239I through data-power interface 237I. FIG. 2 also illustrates that time sensitive network switch 250 is individually coupled to each LIDAR sensor in LIDAR sensor array 265 through data-power interfaces 237D, 237E, and 237F. That is, each LIDAR sensor in LIDAR sensor array 265 has a connector (e.g. connectors 235D-235F) coupled to a connector (e.g. connectors 239D-239F) of time sensitive network switch 250 through its own data-power interface (e.g. data-power interface 237D-237F). In the illustrated implementation of FIG. 2, connector 235D is coupled to connector 239D through data-power interface 237D, connector 235E is coupled to connector 239E through data-power interface 237E, and connector 235F is coupled to connector 239F through data-power interface 237F. In these implementations, the cameras, RADAR sensors, and LIDAR sensor are merely examples of sensors that can be implemented as sensors of an autonomous vehicle that may be coupled to time sensitive network switch 250 through a data-power interface (e.g., data-power interface 237A-237I). Consequently, the data-power interface may separately couple any sensors that are utilized in different implementations to time sensitive network switch 250 where time sensitive network switch 250 includes a separate connector for the data-power interface of each sensor in the array of sensors.

Data-power interfaces 237A-237I include at least one high-speed vehicle communication link and may also provide an elevated voltage to each sensor to power the sensor. The high-speed vehicle communication link may be defined as more than 100 Megabits per second (Mb/s), in some implementations.

Time sensitive network switch 250 is configured to receive sensor data from any of the sensors in the array of sensors that are coupled to time sensitive network switch 250 through data-power interfaces 237A-I. Time sensitive network switch 250 is "time sensitive" because it is configured to transfer the received sensor data to trajectory computing unit 205 with very little delay so that trajectory computing unit 205 can utilize the sensor data to operate the autonomous vehicle to be responsive to objects that are sensed by the sensors. Time sensitive network switch 250 may time-stamp received sensor data before forwarding the sensor data to trajectory computing unit 205. Time sensitive network switch 250 may include a plurality of multi-core processors. Time sensitive network switch 250 may be configured to prioritize the transmission of selected sensor data through interface 257, in FIG. 2. For example, the time sensitive network switch 250 may prioritize the transmission of first sensor data from particular sensors over the transmission of second sensor data from different sensor based on vehicle operation data of the autonomous vehicle. In some implementations, one or more processors that are external to a time sensitive switch may control the time sensitive network switch to prioritize particular sensor data.

Trajectory computing unit 205 may include one or more of the components and/or subsystems included in control subsystem 150 of FIG. 1C, such as trajectory subsystem 156. Trajectory computing unit 205 may be a processing board including a plurality of multi-core processors and a plurality of memory devices. The processing board may also include communication interfaces and be coupled to a heat-sink or be cooled by a fan system. Trajectory computing unit 205 may process the sensor data received from time sensitive network switch 250 to determine objects in an external environment of an autonomous vehicle and generate a trajectory 274 for the vehicle based at least in part on the determination. "Objects" may include inanimate objects such as obstacles, barriers, building, other vehicles, poles, and/or signs, for example. Objects may, in some implementations, refer additionally to actors on the road such as pedestrians and bicyclists. In some implementations, trajectory computing unit 205 accesses mapping data 203 in addition to processing the sensor data received from time sensitive network switch 250 to determine the trajectory 274. Mapping data 203 may have been collected by vehicles other than the vehicle that is collecting the sensor data. Mapping data 203 may include positions of static bodies (e.g. buildings, barriers, streets) in an external environment of an autonomous vehicle. Mapping data 203 may be provided to trajectory computing unit 205 from network 290 through interface 201. In some implementations, interface 201 is a wireless protocol such as IEEE 802.11 protocols or cellular data protocols (e.g. 3G, 4G, LTE, 5G). Mapping data 203 may be updated by a plurality of vehicles and periodically or continually updated by trajectory computing unit 205 by downloading the updated mapping data from network 290.

In the illustrated implementation, trajectory computing unit 205 may determine the trajectory 274 based at least in part on the received sensor data. In some aspects, the trajectory 274 includes a sequence of one or more actions that are to be performed to autonomously control movement of the vehicle. For example, the trajectory may include an intended vehicle path, such as a curved path or a straight-line path, that the vehicle is to follow. In some implementations, the trajectory 274 includes a time-ordered sequence of intended vehicle positions, orientations, and/or momenta. Trajectory computing unit 205 may then transmit the trajectory 274 to control system interface 202 through high-speed data interface 207 and through time sensitive network switch 250.

Control system interface 202 is communicatively coupled to port 258 of time sensitive network switch 250 (through communications bus 209) and to communications bus 217. In some aspects, communications bus 209 is a T1 data bus that supports data rates of up to 1 Gbps. Communications bus 217 may be one or more communications buses of the vehicle, such as a controller area network (CAN) bus. In some aspects, the CAN bus implements a message-based protocol for communication among several control systems of the vehicle, such as control system 210. The communications bus 217 may support data rates in the range of 500 kbps to 1Mbps, and in some implementations may support data rates up to 5 Mbps. The illustrated example of control system 210 is shown as including direction control 212, powertrain control 214, and brake control 216, which may be configured similarly to direction control 112, powertrain control 114, and brake control 116 illustrated in FIG. 1C, respectively. However, control system 210 may include a variety of other vehicle control systems such as transmission, airbags, antilock braking, cruise control, electric power steering, audio systems, power windows, doors, and/or mirror adjustment, just to name a few.

Therefore, the trajectory 274 generated by trajectory computing unit 205 may be generated based on mapping data 203 and the sensor data received from time sensitive network switch 250. Once the trajectory computing unit 205 generates the trajectory 274, the trajectory is sent to control system interface 202 through time sensitive network switch 250. The control system interface 202 then processes the trajectory to determine at least one control signal 275 that is transmitted to the control system 210. In some examples, the control signal 275 is a CAN message. Thus, processing the trajectory may include translating the trajectory into one or more CAN messages according to a CAN protocol utilized by the communications bus 217.

Accordingly, in some aspects, the trajectory computing unit 205 does not have direct access to the communications bus 217, nor to the control system 210. Instead, trajectories generated by the trajectory computing unit 205 are passed through the control system interface 202 to the communications bus 217 in order to effectuate actual control of the vehicle.

In addition to acting as a gateway between the trajectory computing unit 205 and the internal system of the vehicle (e.g., communications bus 217 and/or control system 210), the control system interface 202 may be configured to provide various forms of fault tolerance for the autonomous control of the vehicle. For example, the control system interface 202 may be configured to detect a variety of faults and to take one or more steps to maintain control of the vehicle even in the presence of the fault. The faults detected by the control system interface 202 may include detecting software and/or hardware faults with the control system interface 202 itself and/or detecting software and/or hardware faults with the trajectory computing unit 205. Additional details of the control system interface 202 are provided below with reference to FIGS. 3A, 3B, and 4.

Figure 3A:
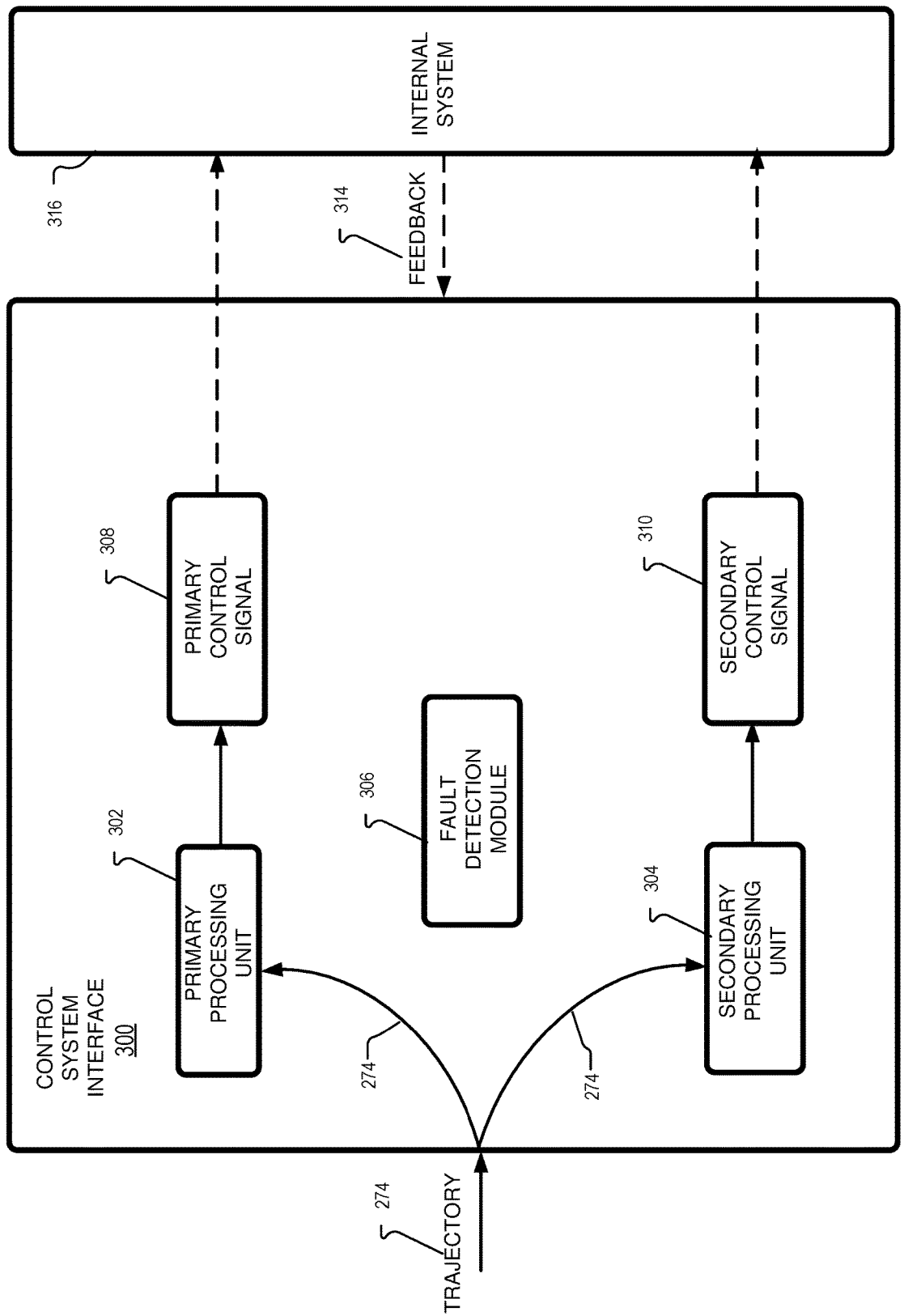
FIG. 3A illustrates a block diagram of an example control system interface, in accordance with aspects of the disclosure.

FIG. 3A illustrates a block diagram of an example control system interface 300, in accordance with aspects of the disclosure. Control system interface 300 is one exemplary implementation of control system interface 158 of FIG. 1C and/or of control system interface 202 of FIG. 2. The illustrated example of control system interface 300 is shown as including a primary processing unit 302, a secondary processing unit 304, and a fault detection module 306. Also shown in FIG. 3A are trajectory 274, primary control signal 308, secondary control signal 310, feedback response signal 314, and internal system 316.

In some implementations, at least one of the primary processing unit 302 or the secondary processing unit 304 are continuously active. For example, where both the primary processing unit 302 and the secondary processing unit 304 are continuously active, the primary processing unit 302 and the secondary processing unit 304 are both configured to receive the trajectory 274 that is generated by the trajectory computing unit 205. In some aspects, the secondary processing unit 304 receives the trajectory 274 concurrently with the primary processing unit 302. Furthermore, the primary processing unit 302 and the secondary processing unit 304 are both configured to process the received trajectory 274 to determine a corresponding control signal (e.g., primary control signal 308 and secondary control signal 310, respectively). In some examples, the processing of the trajectory 274 by the secondary processing unit 304 is independent and distinct from the processing performed on trajectory 274 by the primary processing unit 302. For instance, in some aspects, the processing of the trajectory 274 by the secondary processing unit 304 to determine the secondary control signal 310 is based on a code base that is independent and distinct from a code base utilized by the primary processing unit 302. In some implementations, having separate and distinct code bases may enhance the fault tolerance of the system, by providing variances in how each processing unit responds.

Fault detection module 306 is configured to determine whether there is a fault condition with primary processing unit 302. As will be described in more detail below, fault detection module 306 may be configured to detect a variety of types of faults in primary processing unit 302, including software faults, hardware faults, or a combination thereof. In some implementations, a fault condition exists with primary processing unit 302 if one or more faults or one or more potential faults are detected. Similarly, the fault condition does not exist if faults or potential faults are not detected. In some examples, if there is no fault condition detected with primary processing unit 302, then fault detection module 306 allows primary processing unit 302 to transmit primary control signal 308 to internal system 316. In some implementations, if no fault is detected, fault detection module 306 allows the transmission of both primary control signal 308 and secondary control signal 310 to internal system 316. For example, in some aspects, internal system 316 may be configured to receive redundant and/or complimentary control signals from control system interface 300. For instance, primary control signal 308 may be a first CAN message (e.g., CAN message for braking) that is transmitted on a first channel of the CAN bus, whereas secondary control signal 310 may be a second CAN message (e.g., another CAN message for braking) that is transmitted on a second channel of the CAN bus. The internal system 316 may then include logic and/or processing for determining and/or prioritizing which control signal to implement.

In other implementations, if a fault condition is detected with primary processing unit 302, fault detection module 306 passes autonomous control of the vehicle from primary processing unit 302 to secondary processing unit 304 by preventing the transmission of primary control signal 308 and allowing the transmission of the secondary control signal 310 to internal system 316. For example, the secondary control signal 310 can be already determined to allow seamless transfer of autonomous control to secondary processing unit 304, where the secondary control signal 310 is generated based on the same trajectory 274 that was provided to the primary processing unit 302. In some implementations, after autonomous control of the vehicle is passed to secondary processing unit 304, fault detection module 306 is configured to allow secondary processing unit 304 to maintain control of the vehicle until the hard reset and/or power cycle of the control system interface 300 is completed. Thus, after a fault condition is detected with primary processing unit 302, subsequent trajectories may continue to be processed by both primary processing unit 302 and secondary processing unit 304, but only secondary control signal 310 is enabled to be transmitted to internal system 316. In the illustrated example, internal system 316 may include communications bus 217 (e.g., CAN bus) and/or control system 210 of FIG. 2.

In some examples, fault detection module 306 is further configured to detect a fault condition with secondary processing unit 304. If a fault condition is detected with secondary processing unit 304, fault detection module 306 allows the primary processing unit 302 to maintain autonomous control of the vehicle by preventing the transmission of secondary control signal 310 and allowing the transmission of the primary control signal 308 to internal system 316.

Figure 3B:
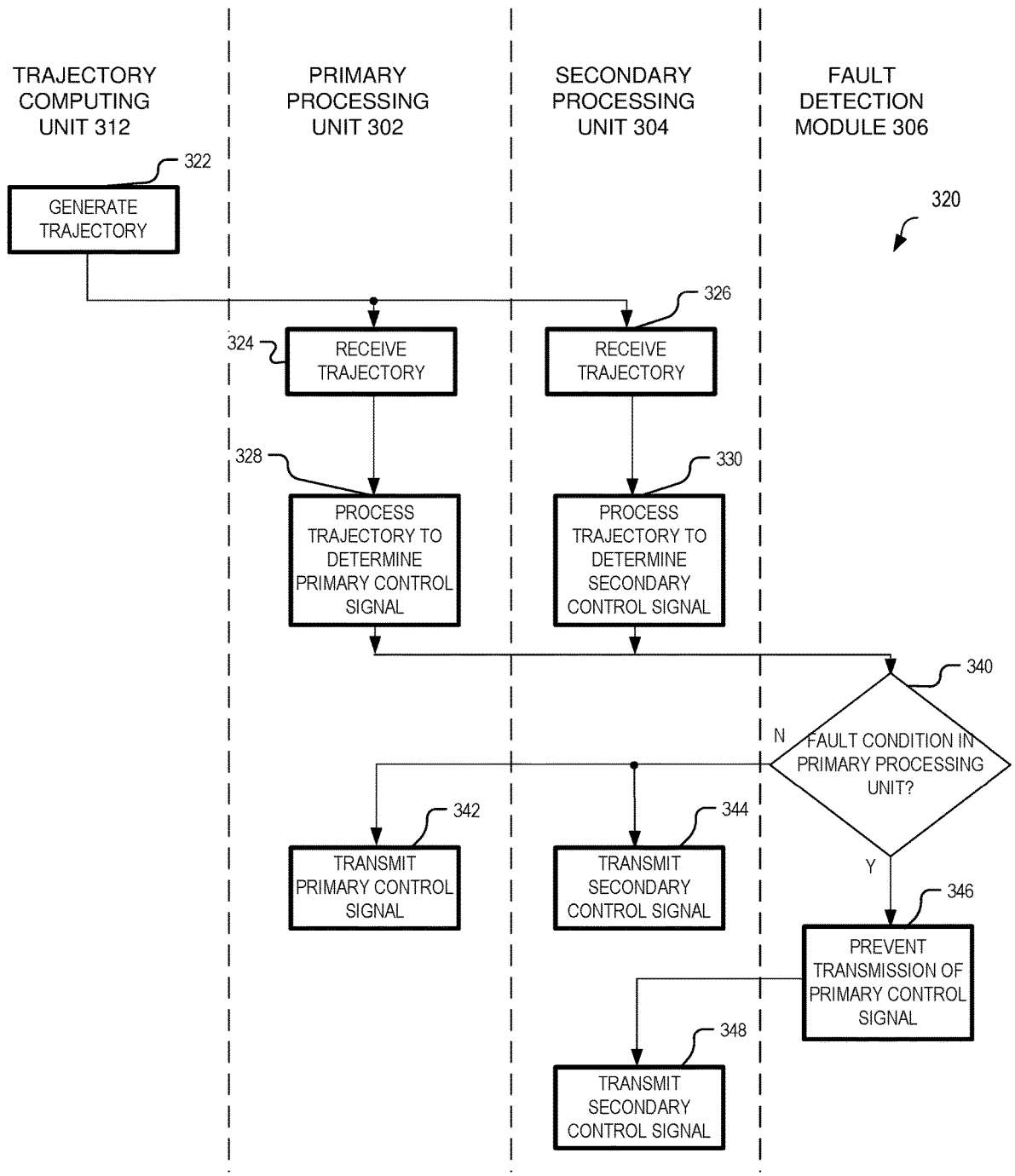
FIG. 3B illustrates a flow chart of a process of operating a control system interface with fault detection, in accordance with aspects of the disclosure.

FIG. 3B illustrates a flow chart of a process 320 of operating a control system interface with fault detection, in accordance with aspects of the disclosure. Process 320 is one exemplary process for operating control system interface 300. Process 320 will be described with reference to FIGS. 2, 3A, and 3B.

In process block 322, trajectory computing unit 312 generates trajectory 274 and transmits the trajectory 274 to the control system interface 300 through high-speed data interface 207 and through time sensitive network switch 250. In process block 324, primary processing unit 302 receives trajectory 274 from time sensitive network switch 250. Similarly, in process block 326, secondary processing unit 304 receives the same trajectory 274. In some implementations, secondary processing unit 304 receives trajectory 274 concurrently with the primary processing unit 302. Next, in process blocks 328 and 330, primary processing unit 302 and secondary processing unit 304 processing trajectory 274 to determine primary control signal 308 and secondary control signal 310, respectively. As discussed above, secondary processing unit 304 processes trajectory 274 independently from the processing performed by primary processing unit 302, and in some instances may be processed based on code bases that are independent and distinct from one another. In some implementations, processing trajectory 274 includes determining one or more control signals that are suitable for transmission to internal system 316 to effectuate control of the vehicle. For example, translating trajectory 274 may include determining one or more CAN signals for transmission to internal system 316 to effectuate a change in steering, braking, and/or acceleration by way of control system 210. Accordingly, in some aspects, the primary control signal 308 may be different from the secondary control signal 310 (e.g., different CAN messages to effectuate differing control of the vehicle).

Next, in decision block 340, fault detection module 306 determines whether there is a fault condition with primary processing unit 302. If no fault condition is detected (i.e., the absence of a fault), process 320 proceeds to process block 342 and process block 344, where primary processing unit 302 is allowed to transmit primary control signal 308 to internal system 316, and secondary processing unit 304 is allowed to transmit secondary control signal 310. However, if, in decision block 340, the fault condition is detected then fault detection module 306 prevents the transmission of primary control signal 308 (i.e., process block 346) and allows transmission of secondary control signal 310 (i.e., process block 348).

Referring back to FIG. 3A, in some implementations, internal system 316 may be configured to generate a feedback response 314. In some aspects, feedback response 314 is generated by internal system 316 in response to one or more previous control signals generated by the control system interface 300. In some aspects, feedback response 314 may be an indication that a previous control signal was successful (e.g., receipt confirmation, requested change was effectual, etc.). In some examples, feedback response 314 may include data that provides information about the adjustments made by the control system (e.g., feedback response 314 may indicate how much the steering was adjusted in response to a previous control signal to adjust the steering).

Thus, in some aspects, fault detection module 306 may be configured to detect a fault in primary processing unit 302 in response to feedback response 314 indicating that a previous primary control signal was non-compliant and/or ineffective. In one example, fault detection module 306 may detect the fault in response to an absence of feedback response 314 being received by control system interface 300. That is, if primary processing unit 302 transmits a primary control signal to internal system 316 for which feedback response 314 is expected, but none is actually received, fault detection module 306 may then determine that a fault exists with primary processing unit 302.

Similarly, fault detection module 306 may determine that the fault exists if feedback response 314 indicates that a previous primary control signal was non-compliant (e.g., an error message). Even still, fault detection module 306 may determine that the fault exists if feedback response 314 includes data about the effectuated change that does not match the change that was expected by control system interface 300. By way of example, primary processing unit 302 may transmit a primary control signal to internal system 316 that includes instructions to adjust steering by 15 degrees. However, feedback response 314 may indicate that steering was, in fact, only adjusted by 5 degrees. In this example, fault detection module 306 may determine the fault due to the indication in feedback response 314 about the effectuated adjustment not matching what was expected.

In some implementations, fault detection module 306 is configured to detect the fault in response to an absence of trajectory 274 being received by primary processing unit 302. In one example, fault detection module 306 may detect the absence of trajectory 274 if no trajectory has been received by primary processing unit 302 for a predetermined amount of time. In another example, fault detection module 306 may detect the absence of trajectory 274 if secondary processing unit 304 receives trajectory 274, but primary processing unit 302 does not.

In some implementations, fault detection module 306 includes a watchdog timer that is communicatively coupled to primary processing unit 302 to detect the fault. For example, primary processing unit 302 may be configured to periodically send a restart signal to the watchdog timer to restart the timer. If no restart signal is received by the watchdog timer before the timer elapses, then fault detection module 306 may determine that a fault exists with primary processing unit 302.

In some examples, the watchdog timer included in fault detection module 306 is configured to periodically receive a data package from primary processing unit 302 and to determine that a fault exists based on the data package. For example, in some aspects, primary processing unit 302 may read a seed value contained in the watchdog timer and then perform one or more predetermined numerical operations based on the seed value to periodically generate a data package. The data package is then sent to the watchdog timer of fault detection module 306, which analyzes the data package to determine the validity of the numerical operations performed by primary processing unit 302. If the data package indicates that the numerical operations are incorrect, then fault detection module 306 may determine that a fault exists with primary processing unit 302.

In some implementations, fault detection module 306 is coupled to one or more data buses and/or power buses of primary processing unit 302. Thus, fault detection module 306 may determine the fault in response to a lack of one or more power sources provided to primary processing unit 302 and/or in response to an incorrect power level being provided to primary processing unit 302. In another implementation, fault detection module 306 may determine the fault in response to a detected incorrect signal level on one or more data buses connected to primary processing unit 302.

In some implementations, primary processing unit 302 is configured to receive measurement data from one or more inertial measurement units (IMUs) of the vehicle. The measurement data may be utilized by primary processing unit 302 to determine the one or more primary control signals (e.g., measurement data may indicate current momentum of the vehicle, which may be utilized by primary processing unit to determine adjustments to be made to the powertrain to effectuate trajectory 274). Even still, the measurement data may be utilized by primary processing unit 302 to determine the efficacy of a previous primary control signal (e.g., a previous primary control signal to apply braking may be verified, in part, based on measurement data indicating that the vehicle has slowed). Thus, in some aspects, fault detection module 306 may determine a fault in primary processing unit 302 in response to an absence of measurement data being received by primary processing unit 302. For example, fault detection module 306 may determine the fault if no measurement data has been received by primary processing unit 302 for a predetermined amount of time.

The above-described implementations of fault detection module 306 describe fault detection module 306 detecting one or more faults with the primary processing unit 302 and then in response thereto, transferring autonomous control of the vehicle to secondary processing unit 304. However, in some examples, fault detection module 306 may also be configured to detect a fault with the trajectory computing unit (e.g., trajectory computing unit 205 of FIG. 2), itself. If fault detection module 306 detects a fault with trajectory computing unit 205, primary processing unit 302 may be configured to generate and transmit one or more remedial control signals to internal system 316. For example, the remedial control signals may include commands to direct the vehicle to the side of the road, to perform a stop, etc. In some aspects, fault detection module 306 determines the fault with trajectory computing unit 205 in response to no trajectory being received by either primary processing unit 302 or by secondary processing unit 304 after a predetermined amount of time. In another aspect, fault detection module 306 may determine the fault with trajectory computing unit 205 in response to an incorrectly formatted trajectory 274. Even still, fault detection module 306 may determine the fault with trajectory computing unit 205 in response to trajectory 274 including conflicting or incongruent commands (e.g., full acceleration plus full braking).

Figure 4:
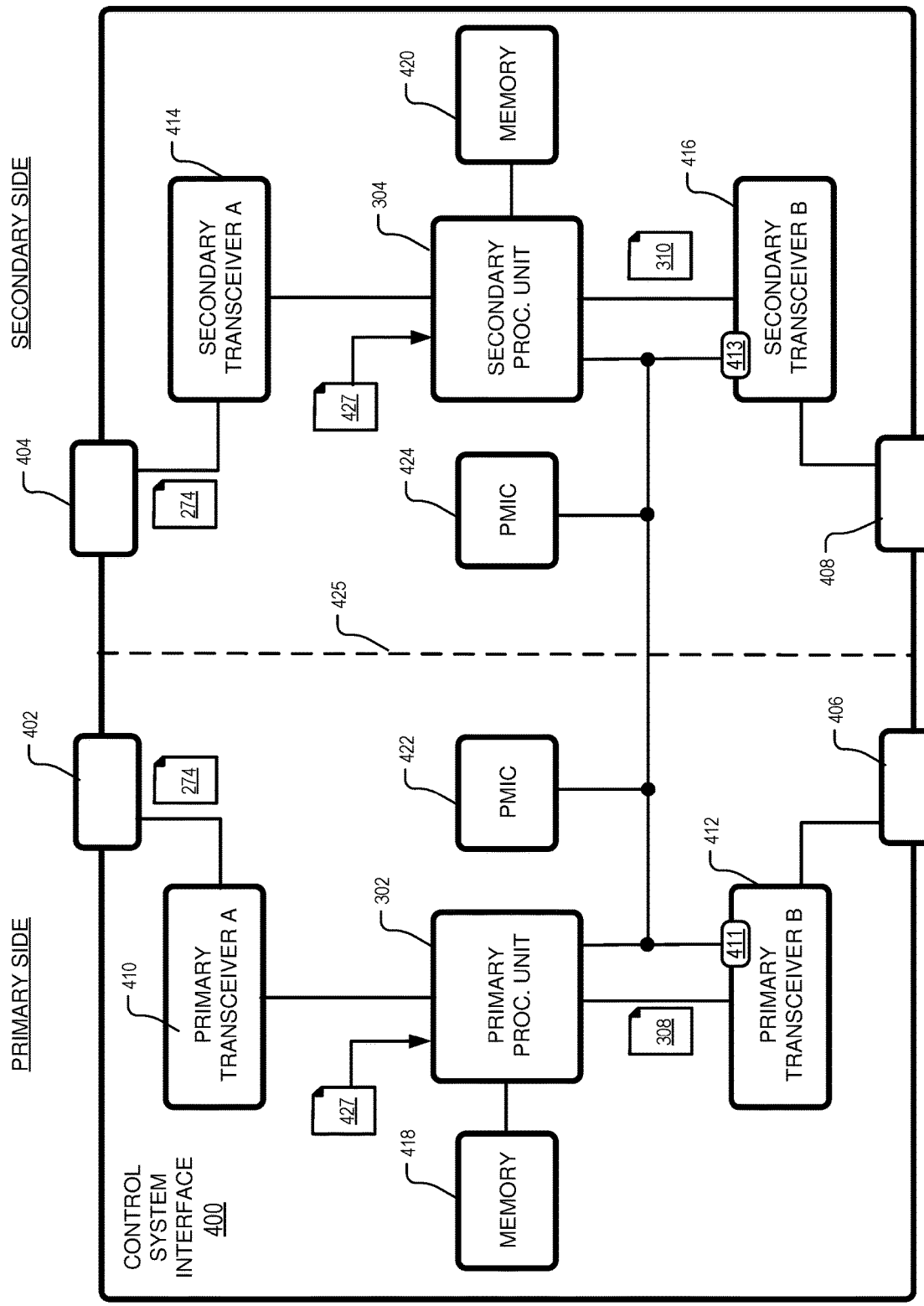
FIG. 4 illustrates a block diagram of another example control system interface, in accordance with aspects of the disclosure.

FIG. 4 illustrates a block diagram of another example control system interface 400, in accordance with aspects of the disclosure. Control system interface 400 is one implementation of control system interface 300 of FIG. 3A. The illustrated example of control system interface 400 is shown as including primary processing unit 302, secondary processing unit 304, connector 402, connector 404, connector 406, connector 408, primary transceiver A 410, primary transceiver B 412, secondary transceiver A 414, secondary transceiver B 416, memory 418, memory 420, power management integrated circuit (PMIC) 422, and PMIC 424. Also shown in FIG. 4 are trajectory 274, measurement data 427, primary control signal 308, secondary control signal 310, enable interface 411, enable interface 413, and isolation barrier 425.

In some implementations, control system interface 400 is a circuit board that is disposed in the vehicle in a location separate and distinct from the location of the trajectory computing unit (e.g., trajectory computing unit 205). In some aspects, each of the illustrated components 302, 304, 402, 404, 406, 408, 410, 412, 414, 416, 418, 420, 422, and 424 are separate circuits, packages, chips, and/or components that are mounted to the circuit board. For example, primary processing unit 302 and secondary processing unit 304 may each be implemented as a separate processor/microcontroller that is mounted on the circuit board. In another example, memory 418 may include one or more memory chips (e.g., embedded multimedia card (eMMC), RAM, flash), while memory 420 may include one or more additional memory chips of its own.

As shown in FIG. 4, connectors 402 and 404 are each to be coupled to a data interface (e.g., communications bus 209 of FIG. 2) to receive trajectory 274 from the time sensitive network switch 250. Furthermore, connectors 406 and 408 are each to be coupled to a communication bus of the vehicle (e.g., communication bus 217 of FIG. 2) for transmitting control signals 308/310 to the internal system of the vehicle (e.g., internal system 316 of FIG. 3 and/or control system 210 of FIG. 2).

In some implementations, each of the components to the left of isolation barrier 425 (e.g., "PRIMARY SIDE" as drawn in FIG. 4) are electrically isolated from the components to the right of isolation barrier 425 (i.e., "SECONDARY SIDE" as drawn in FIG. 4). In some examples, isolation barrier 425 includes one or more isolation buffers (not explicitly shown in FIG. 4) to allow communication between the primary side and the secondary side while still maintaining electrical isolation. In some aspects, isolation barrier 425 is provided to maintain the integrity of the circuits/components of FIG. 4. For example, isolation barrier 425 may be included to prevent a short, power surge, or physical damage that occurs on one side from affecting the components on the other.

In the illustrated example, PMIC 422 and PMIC 424, collectively, may correspond to the fault detection module 306 of FIG. 3A, and may be configured to perform any of the operations discussed above with reference to fault detection module 306. That is, PMIC 422 may be configured to detect a fault condition in primary processing unit 302, whereas PMIC 424 may be configured to detect a fault condition in secondary processing unit 304. As shown in FIG. 4, primary transceiver B 412 is coupled to receive the primary control signal 308 from primary processing unit 302 and to transmit primary control signal 308 to the internal system through connector 406. Primary transceiver B 412 is also shown as including enable interface 411. PMIC 422 is coupled to enable interface 411 to selectively enable or disable the transmission of primary control signal 308. Similarly, PMIC 424 is coupled to enable interface 413 of secondary transceiver B 416 to enable or disable the transmission of secondary control signal 310. Thus, in operation, and in the absence of a fault condition in primary processing unit 302, PMIC 422 may enable primary transceiver B to transmit primary control signal 308, and similarly PMIC 424 enables secondary transceiver B 416 through enable interface 413 to allow the transmission of secondary control signal 310. Similarly, in response to detecting a fault condition with primary processing unit 302, PMIC 422 disables primary transceiver B 412, whereas PMIC 424 enables secondary transceiver B 416 to allow the transmission of secondary control signal 310.

In some implementations, PMIC 422 and PMIC 424 are coupled to one or more buses, I/O ports, and/or other pins (e.g., general purpose I/O, fault I/O, I2C, etc.) of their respective processing units 302/304 to monitor and detect the above-described faults. In addition, PMIC 422 and PMIC 424 may be coupled to one or more power buses to monitor power provided to their respective processing units 302/304, and to detect a fault based on a missing or incorrect power level. Furthermore, one or both of PMIC 422 and PMIC 424 may include a watchdog timer, as described above, to detect a fault in the primary processing unit 302 and secondary processing unit 304, respectively.

FIG. 4 also illustrates primary processing unit 302 and secondary processing unit 304 as receiving measurement data 427. In some examples, measurement data 427 includes data acquired from one or more IMUs through an additional communication port (not shown in FIG. 4). Measurement data 427 may also include data acquired from one or more sensors (e.g., temperature sensors) that are included on the circuit board of control system interface 400. In some implementations, the data acquired from one or more IMUs or sensors may be processed before being provided to primary processing unit 302 or secondary processing unit 304. For example, two different types of sensor data can be associated together. As another example, sensor data can be associated with IMU data based on time stamping.

The term "processing unit" or "computing unit" (e.g. primary processing unit 302, secondary processing unit 304, trajectory computing unit 205, etc.) in this disclosure may include one or more processors, microprocessors, multi-core processors, and/or Field Programmable Gate Arrays (FPGAs) to execute operations disclosed herein. In some implementations, memories (not illustrated) are integrated into the processing logic to store instructions to execute operations and/or store data. Processing logic may include analog or digital circuitry to perform the operations disclosed herein.

Network 170 and/or 290 may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit (ASIC) or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors). For example, a machine-readable storage medium includes recordable/non-recordable media (e.g., read only memory (ROM), random access memory (RAM), magnetic disk storage media, optical storage media, flash memory devices).

The above description of illustrated implementations of the invention, including what is described in the Abstract, is not intended to be exhaustive or to limit the invention to the precise forms disclosed. While specific implementations of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific implementations disclosed in the specification. Rather, the scope of the invention is to be determined entirely by the following claims, which are to be construed in accordance with established doctrines of claim interpretation.

What is claimed is:

1. A control system for an autonomous vehicle comprising:
   a time sensitive network switch configured to receive sensor data representative of estimated objects that are in an external environment of the autonomous vehicle;
   a control system interface configured to receive a trajectory of the autonomous vehicle from the time sensitive network switch, wherein the control system interface includes:
   a primary processing unit configured to receive the trajectory;
   a secondary processing unit configured to receive the trajectory; and
   a fault detection module configured to: (1) detect a fault condition with the primary processing unit; and (2) prevent the primary processing unit from transmitting a primary control signal in response to the fault condition, wherein the primary control signal is for autonomous control of the autonomous vehicle, wherein the control system interface is coupled as a gateway between the time sensitive network switch and a Control Area Network (CAN) bus of the autonomous vehicle.

2. The control system of claim 1, wherein the control system interface is configured to translate the trajectory into a Control Area Network (CAN) message.

3. The control system of claim 1, wherein the trajectory is defined for a particular destination and a particular period of time, and wherein the control system interface is configured to take one or more steps to control the autonomous vehicle if the fault condition is detected.

4. The control system of claim 1, wherein the fault detection module is further configured to allow the secondary processing unit to generate and transmit a secondary control signal to an internal system for autonomous control of the autonomous vehicle.

5. The control system of claim 1, wherein, in response to not detecting the fault condition, the fault detection module is further configured to:
 allow the primary processing unit to generate and transmit the primary control signal to an internal system for autonomous control of the autonomous vehicle; and
 allow the secondary processing unit to generate and transmit a secondary control signal to the internal system.

6. The control system of claim 1, wherein the fault detection module is further configured to detect a fault condition with the secondary processing unit and in response thereto:
 prevent the secondary processing unit from transmitting a secondary control signal to an internal system for autonomous control of the autonomous vehicle; and
 allow the primary processing unit to generate and transmit the primary control signal to the internal system.

7. The control system of claim 1, wherein the fault detection module is configured to detect the fault condition in response to detecting an incorrect signal level on one or more buses coupled to the primary processing unit.

8. The control system of claim 1, wherein the fault detection module is configured to detect the fault condition in response to an absence of the trajectory being received by the primary processing unit.

9. The control system of claim 1, wherein the primary processing unit is configured to:
 translate the trajectory into the primary control signal, and transmit the primary control signal to the CAN bus to adjust at least one of steering, braking, or acceleration of the autonomous vehicle.

10. A computer-implemented method comprising:
 transmitting, with a time sensitive network switch, a trajectory of an autonomous vehicle to a control system interface, wherein the time sensitive network switch is configured to receive sensor data representative of estimated objects that are in an external environment of the autonomous vehicle;
 receiving the trajectory with a primary processing unit of the control system interface;
 receiving the trajectory with a secondary processing unit of the control system interface;
 detecting a fault condition with a fault detection module of the control system interface; and
 preventing the primary processing unit from transmitting a primary control signal in response to the fault condition, wherein the control system interface is coupled as a gateway between the time sensitive network switch and a Control Area Network (CAN) bus of the autonomous vehicle.

11. The computer-implemented method of claim 10 further comprising:
 translating, with the control system interface, the trajectory into a Control Area Network (CAN) message.

12. The computer-implemented method of claim 10 further comprising:
 detecting the fault condition in response to detecting an incorrect signal level on one or more buses coupled to the primary processing unit.

13. An autonomous vehicle comprising:
 an internal system for adjusting at least one of steering, braking, or acceleration of the autonomous vehicle;
 a time sensitive network switch configured to receive sensor data representative of estimated objects that are in an external environment of the autonomous vehicle;
 a control system interface configured to receive a trajectory of the autonomous vehicle from the time sensitive network switch, wherein the control system interface includes:
  a primary processing unit configured to receive the trajectory;
  a secondary processing unit configured to receive the trajectory; and
  a fault detection module configured to: (1) detect a fault condition with the primary processing unit; and (2) prevent the primary processing unit from transmitting a primary control signal to the internal system in response to the fault condition, wherein the primary control signal is for autonomous control of the autonomous vehicle, wherein the control system interface is coupled as a gateway between the time sensitive network switch and a Control Area Network (CAN) bus of the autonomous vehicle.

14. The autonomous vehicle of claim 13, wherein the control system interface is configured to translate the trajectory into a Control Area Network (CAN) message.

15. The autonomous vehicle of claim 13, wherein the trajectory is defined for a particular destination and a particular period of time, and wherein the control system interface is configured to take one or more steps to control the autonomous vehicle if the fault condition is detected.

16. The autonomous vehicle of claim 13, wherein the fault detection module is further configured to allow the secondary processing unit to generate and transmit a secondary control signal to the internal system for autonomous control of the autonomous vehicle.

17. The autonomous vehicle of claim 13, wherein the fault detection module is configured to detect the fault condition in response to an absence of the trajectory being received by the primary processing unit.

\* \* \* \* \*